United States Patent [19]

Alban

[11] Patent Number: 4,713,007
[45] Date of Patent: Dec. 15, 1987

[54] AIRCRAFT CONTROLS SIMULATOR

[76] Inventor: Eugene P. Alban, 312 Temko Terr., Daytona Beach, Fla. 32018

[21] Appl. No.: 786,871

[22] Filed: Oct. 11, 1985

[51] Int. Cl.$^4$ ................................................. G09B 9/08
[52] U.S. Cl. ............................ 434/45; 273/DIG. 28; 434/43; 244/223
[58] Field of Search ....................... 434/20, 30, 43, 44, 434/45; 273/DIG. 28; 244/233, 228

[56] References Cited

U.S. PATENT DOCUMENTS

| | | | |
|---|---|---|---|
| 2,472,888 | 6/1949 | Cunningham | 434/45 |
| 3,903,614 | 9/1975 | Diamond et al. | 434/45 |
| 4,478,407 | 10/1984 | Manabe | 434/45 |
| 4,599,070 | 7/1986 | Hladky et al. | 434/45 |

Primary Examiner—Leo P. Picard
Attorney, Agent, or Firm—Macdonald J. Wiggins

[57] ABSTRACT

An aircraft controls simulator, for use with a computer programmed for aircraft flight simulation, having a yoke, a throttle control and a rudder control. A cabinet has a shaft extending therefrom attached to a simulated yoke control. The shaft operates an elevator potentiometer responsive to horizontal movement of the shaft and an aileron control responsive to rotation of the shaft. A throttle knob connected to a second shaft operates a throttle potentiometer. A foot operated potentiometer produces rudder control signals. A cable connects the potentiometers to the computer which utilizes the potentiometer positions to operate the flight simulation program.

10 Claims, 6 Drawing Figures

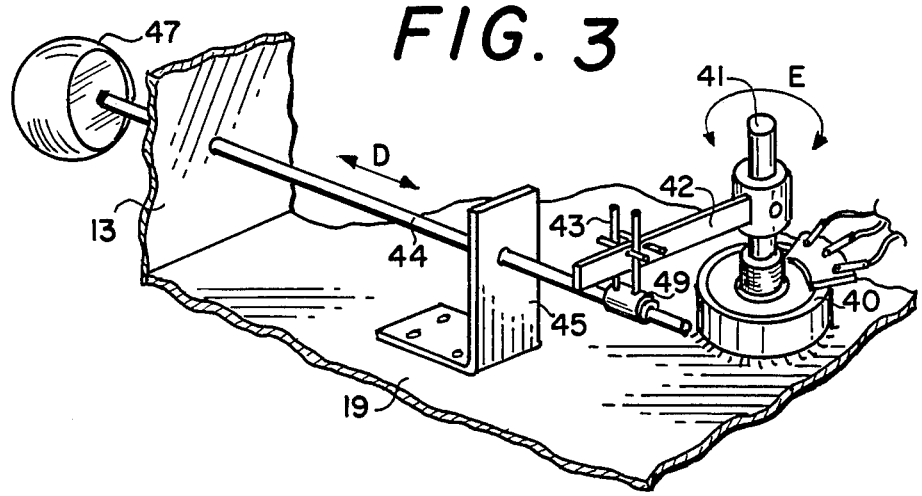
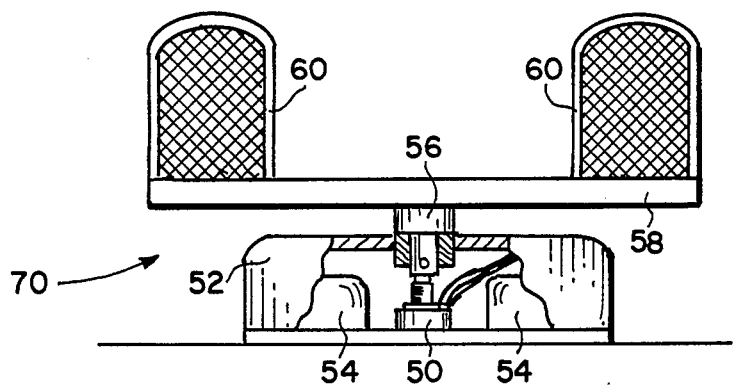
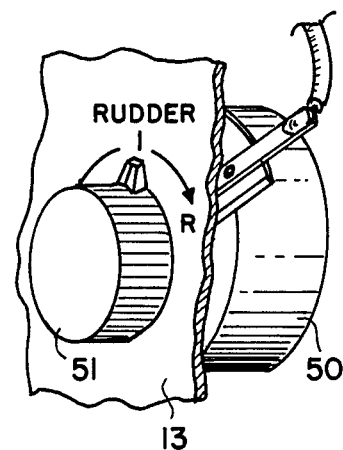
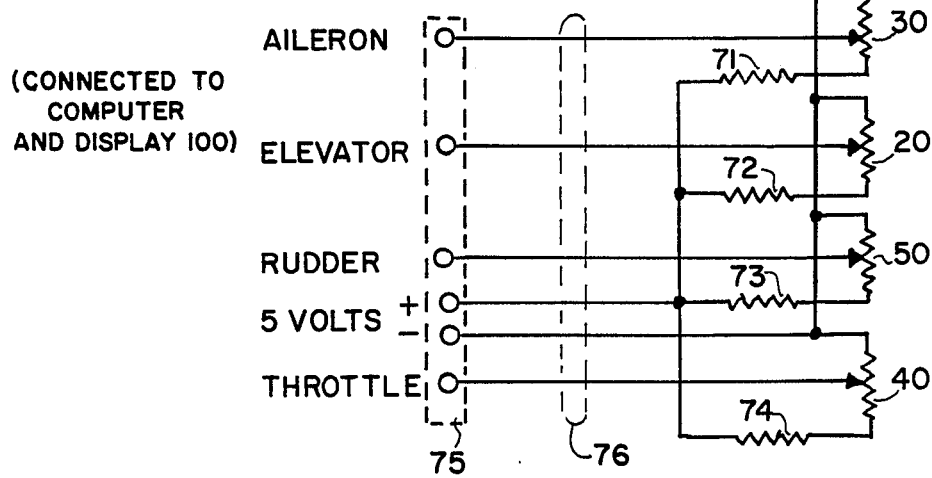

4,713,007

AIRCRAFT CONTROLS SIMULATOR

BACKGROUND OF THE INVENTION

1. Field of the Invention

The present invention relates to computer game controls, and more particularly to a device which simulates the major controls of an aircraft for use with flight simulator programs.

2. Description of the Prior Art

There are a number of personal computer programs available on the market which are utilized to provide various types of simulated aircraft flight, such as take-offs, landings, maneuvers, instrument flight, and navigation with realistic display graphics on the computer monitor. In many instances, the computer keyboard is used to enter instructions to the computer. While of some value, such approach lacks the actual feel and movements that would be used in piloting an aircraft. Typical flight simulation programs include the ASI-IFR software produced by Alban Scientific, Inc., Worlds of Flight available from Tom Mix Software, and F-16 available from KRT Software, and Flight Simulator II from Sublogic.

There is a need for a low cost control simulator which will give the appearance and feel of the yoke control, the throttle control, and rudder controls for a light aircraft to be used in conjunction with any of these programs for flight simulation.

SUMMARY OF THE INVENTION

The present invention may be packaged in any desired configuration. However, a simple arrangement is to provide a small cabinet having an aircraft control yoke mounted to the panel by means of a movable shaft, and a throttle knob and shaft mounted adjacent to the control yoke. If desired, the yoke and throttle controls may be full sized as would be found in a light aircraft or these controls could be somewhat smaller.

The control yoke is attached to a control shaft which projects from the cabinet. The yoke may be turned to rotate the shaft to simulate aileron control and may be pushed in and withdrawn to simulate elevator control. A pair of electrical potentiometers is disposed in the cabinet and connected to the control shaft. Each potentiometer is connected to a 5 volt source such that the center arms thereof can produce an output voltage between zero and 5 volts to be used by the computer to simulate motion of an aircraft responsive to the aircraft control surfaces.

The elevator potentiometer is secured to the cabinet and coupled to the control shaft by a lever arm to cause it to rotate when the control yoke is pushed forward or pulled rearward. A centering spring may be included to apply physical resistance to operation of the elevator control to heighten realism of the simulation. The control shaft is also coupled to the shaft of the aileron potentiometer which is free to move without rotation of the shaft when the elevator control is used. When the aileron control is simulated by rotation of the yoke, the potentiometer shaft rotates, producing an output voltage between zero to 5 volts. A centering spring may be used in conjnction with the aileron potentiometer.

The throttle control operates in a similar fashion as the elevator control, having a spherical knob attached to a slidable shaft adapted to rotate the shaft of a throttle potentiometer.

A floor mounted unit is provided with a rudder potentiometer that is rotatable by a pair of foot pedals. Alternatively, a potentiometer and knob can be mounted on the cabinet panel to simulate operation of the rudder.

The various potentiometers are connected to a multi-conductor cable having a plug for connecting into the computer.

As will now be recognized, the invention provides a set of simulated light aircraft controls to permit the user of a computer flight simulation program to gain a realistic experience and practice in flying an aircraft.

It is therefore a principal object of the invention to provide a realistic controller for an aircraft flight simulation program for a computer having aileron, elevator, rudder and throttle controls.

It is another object of the invention to provide a controller having an aircraft type control yoke and a throttle knob in which the control yoke operates in aileron potentiometer and an elevator potentiometer.

It is yet another object of the invention to provide an elevator and aileron simulation control yoke having resistance to operation thereof and means for applying a centering bias thereto.

These and other objects and advantages of the invention will become apparent from the following detailed description when read in conjunction with the drawings.

BRIEF DESCRIPTION OF THE DRAWINGS

FIG. 3 is a cutaway view of a typical throttle control arrangement;

FIG. 4 is a cutaway view of a typical rudder control assembly;

FIG. 5 is a partial view of a front panel with an alternative rudder control; and FIG. 6 is a schematic view of the electrical connection of the invention.

DETAILED DESCRIPTION OF THE PREFERRED EMBODIMENT

Figure 1:
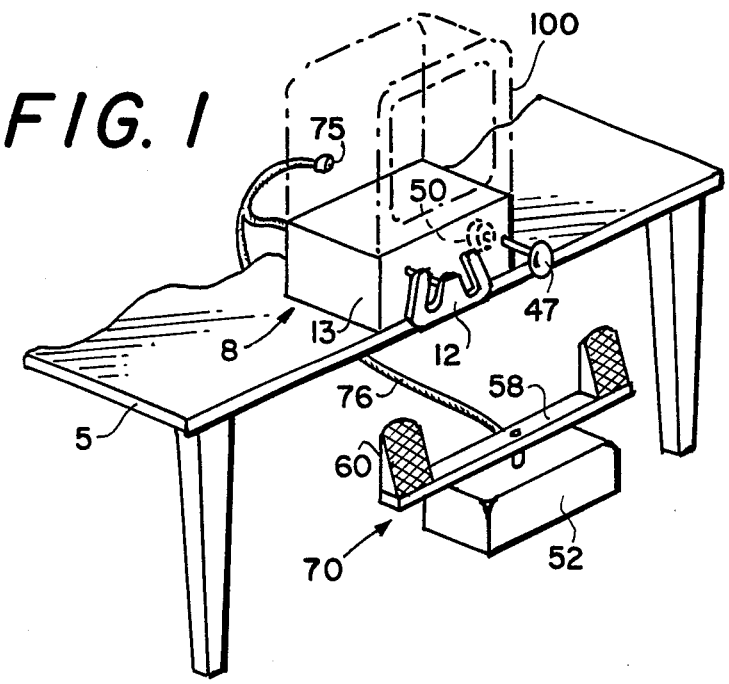
FIG. 1 shows a typical setup for the invention with a computer display shown in phantom view.

FIG. 1 illustrates a possible arrangement of the invention when used in connection with a computer and display unit. A cabinet 8 having a front panel 13 which contains a set of potentiometers which are connected by a cable 76 to a computer and display unit 100 shown in phantom view placed on top of cabinet 13. The cabinet 13 is shown resting on table 5. An aileron and elevator control yoke 12 and throttle 47 project from cabinet 13 and are appropriately located for a user seated before the setup. On the floor beneath table 5 is a rubber control unit 70 having a base unit 52, a rotatable crossbar 58 and a pair of foot pedals 60. As will be discussed below, pedals 60 may be operated by the user's feet to simulate control of a rudder. An alternative rudder control 51 is indicated in phantom view as will be discussed hereinafter.

Figure 2:
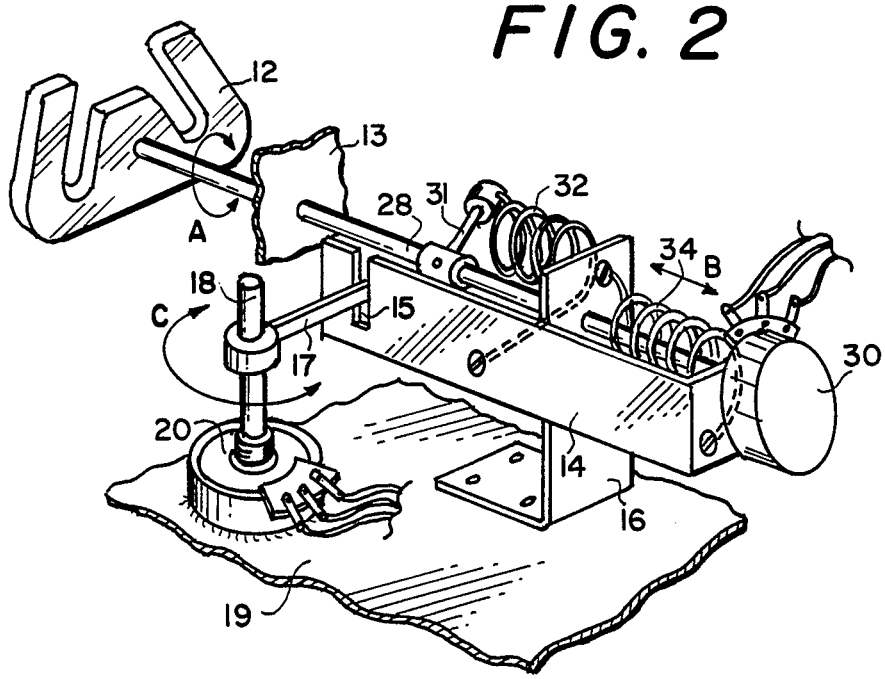
FIG. 2 is a cutaway perspective view of the aileron and elevator control arrangement.

Details of a preferred arrangement for the elevator and aileron control elements is shown in FIG. 2. In this view, a bottom plate 19 of cabinet 8 is shown in partial view as well as a partial view of cabinet panel 13. An upright bracket 16 is attached to bottom plate 19 and supports a shaft 28 which may have a diameter of ¼". Holes through bracket 16 and front panel 13 act as bearings for shaft 28. Shaft 28 is connected to a simulated aircraft control yoke 12 which may be full size or smaller. Wheel 12 may be made from any suitable material but preferably is of plastic to minimize cost. As will be recognized, shaft 28 may be moved inward and outward by means of control yoke 12. At the rear of shaft 28, the control shaft of a potentiometer 30 is coupled thereto.

Potentiometer 30 is mounted to a horizontally disposed L-shaped bracket 14 by its bushing and lock nut. Thus, bracket 14 will move forward and to the rear as shaft 28 is moved horizontally by control yoke 12. Bracket 14 is guided by vertical bracket 16 such that potentiometer 30 will not rotate as shaft 28 is moved backward and forward. A notch 15 cut in the forward end of bracket 14 is coupled by a lever arm 17 to control shaft 18 of potentiometer 20. As will be noted, potentiometer 20 is attached to bottom plate 19 which may be done with epoxy cement or the like. Therefore, as yoke 12 is moved backward and forward, potentiometer 20 will be rotated as indicated by arrow C and is utilized to simulate movement of the elevator surfaces of an aircraft. When control yoke 12 is rotated as indicated by arrow A, shaft 28 rotates the wiper of potentiometer 30 to simulate aileron control of an aircraft.

It is desirable to provide some resistance to movement of yoke 12 both laterally and in rotation to more realistically simulate the feeling of an aircraft control yoke. To that end, torsion spring 32 is attached by rod 31 to shaft 28 at one end and to bracket 14 at the other end. As shaft 28 rotates, spring 32 acts as a torsion spring to oppose the rotation in either direction. It also acts as a centering spring and is adjusted to define the desired center position of potentiometer 30 which would represent level flight of the aircraft.

Similarly, compression spring 34 is provided between the end of bracket 14 and vertical bracket 16. As control yoke 12 is moved inward and outward, spring 34 is either compressed or stretched providing resistance to the motion. Spring 34 also acts as a centering spring and lever arm 14 is adjusted to place elevator potentiometer 20 in a neutral position for level flight when centered.

FIG. 3 shows a cutaway view of cabinet 8 illustrating a typical throttle control assembly. Here, potentiometer 40 is attached to bottom plate 19. A vertical bracket 45 is provided with holes in front panel 13 and bracket 45 supporting shaft 44 which is free to slide in panel 13 and bracket 45 as indicated by arrow D. A round knob is attached to the outer end of shaft 44 to simulate a typical throttle control. A fork assembly 43 is mounted at the inner end of shaft 44 and is coupled to lever arm 42 by rotatable bushing 49. Arm 42 operates control shaft 41 of potentiometer 40. Thus, movement of knob 47 inward and outward simulates the operation of the throttle of the aircraft.

In FIG. 4, the arrangement for operation of the rudder potentiometer is shown. Rudder potentiometer 50 is mounted into base unit 52 along with weights 54 which may be included to give the unit stability. A felt or rubber mat may be also attached to the bottom surface thereof to provide friction with the floor. A bushing assembly 56 is provided which couples crossarm 58 to potentiometer 50 such that movement of pedals 60 by the user's feet will cause rotation of potentiometer 50. Since the rudder control is not critical, the rudder control potentiometer may be mounted on panel 13 and controlled by knob 51 as shown in FIG. 5 and in phantom view in FIG. 1. This alternative arrangement reduces the cost of the controls simulator.

Since normally only a small movement of rudder pedals is required, it may be desirable to drive potentiometer through a gearing arrangement such that a small rotation results in a large rotation of potentiometer 50. Alternatively, a high voltage may be applied to potentiometer 50 such that the output voltage has a greater swing than for the normal operating voltage.

A typical electrical connection for the simulator of the invention is shown in schematic form in FIG. 5. As shown, potentiometers 20, 30, 40, and 50 have one side of each connected through a sensitivity resistor 71, 72, 73 and 74. These resistors may be adjusted to produce a desired maximum swing of voltage when the simulated controls are moved over their maximum range. Generally, most programs and logic circuits in the computer require a maximum of 5 volts. Consequently, FIG. 5 shows 5 volts applied to the potentiometer circuits. However, it is to be understood that this voltage may be varied in accordance with the computer, the program and the sensitivity required from the potentiometers. The wiper arms of each potentiometer are connected to a pin on a plug 75 via a cable 76. The type of plug 75 and the pin connections are selected to match the computer and program with which the device will be used as will be clear to those of skill in this art.

As will now be understood, the user is seated in front of the control box with the rudder control unit 70 at a convenient location to permit operation thereof with the user's feet. The program is loaded into the computer and the simulated aircraft shown on the graphic display on the screen is observed while the throttle control 47, aileron and elevator control 12, and rudder control 70 are operated to perform take-offs, landings, and other maneuvers within the capabilities of the flight simulation program. It has been found that when the system is operated in a darkened room or with a hood placed over the operator and computer, a very realistic feeling of flight is obtained and the user obtains both manual and psychological practice in aircraft flight.

Although specific mechanical arrangments of the controls and the potentiometers have been disclosed, it will be apparent to those of skill in the art to use a variety of other arrangements to obtain the desired rotation of the potentiometers. Such variations are considered to fall within the scope and spirit of the invention.

I claim:

1. A simulated aircraft control system for providing input signals to computer flight simulation programs to thereby produce graphic flight simulation displays on a personal computer screen comprising:

a chassis having a first bracket disposed vertically and attached thereto;

a first electrical potentiometer having a control shaft and attached to said chassis a simulated aircraft yoke control having a yoke shaft projecting therefrom, said shaft supported in a horizontal position by said first bracket, and rotatable and movable horizontally with respect to said first bracket by said yoke control;

a second electrical potentiometer having a control shaft, said control shaft directly connected to said yoke shaft, said second potentiometer having a second bracket disposed horizontally and attached thereto, said second bracket and said second potentiometer movable horizontally by said yoke shaft, said second bracket including means for preventing said second bracket from rotating when said yoke control and yoke shaft are rotated thereby causing rotation of said yoke shaft to operate said second potentiometer; and first coupling means for coupling said second bracket to said control shaft of said first potentiometer for rotating same when said second bracket is moved horizontally.

2. The system as defined in claim 1 which further comprises:
   a third bracket disposed vertically and attached to said chassis;
   a simulated aircraft throttle knob having a throttle shaft projecting therefrom, said throttle shaft supported by said third bracket in a horizontal position and movable horizontally by said knob;
   a third electrical potentiometer having a control shaft and attached to said chassis; and
   second coupling means for coupling said throttle shaft to said control shaft of said third electrical potentiometer for rotating same when said throttle shaft is moved horizontally by said knob.

3. The system as defined in claim 2 which further comprises:
   a second chassis disposed adjacent said first chassis;
   a fourth electrical potentiometer having a control shaft and attached to said second chassis;
   a pair of foot pedals attached and rotatable with respect to said second chassis;
   third coupling means for coupling said foot pedals to said fourth potentiometer control shaft for rotation thereof; and
   an electrical cable connected to said first, second, third and fourth potentiometers for connecting same to an electrical plug, said plug adapted to connect to a computer for permitting control of a flight simulation computer program.

4. The system as defined in claim 2 which further comprises:
   a fourth electrical potentiometer attached to said chassis and having a rotatable control shaft; and
   a rudder control knob attached to said fourth potentiometer control shaft for rotation of said fourth potentiometer for simulation of an aircraft rudder control.

5. The system as defined in claim 2 in which said second coupling means includes:
   a horizontal lever arm attached to said third potentiometer control shaft for rotating same;
   a vertically oriented fork attached to said throttle shaft, said lever arm being captivated by said fork to cause horizontal motion of said throttle shaft to rotate said third potentiometer control shaft.

6. The system as defined in claim 1 which further comprises:
   first biasing means coupled to said first bracket and said second potentiometer for centering said first potentiometer in a preselected neutral position and for simulating aircraft elevator control forces on said yoke control; and
   second biasing means coupled to said second bracket and said yoke shaft for centering said second potentiometer in a preselected neutral position and for simulating aircraft aileron control forces on said yoke control.

7. The system as defined in claim 6 in which:

said first biasing means is a compression spring disposed between said first bracket and said second potentiometer; and
said second biasing means is a torsion spring disposed between said yoke shaft and said second bracket.

8. The system as defined in claim 1 in which said first coupling means includes:
   a first horizontal lever arm attached to said first potentiometer control shaft for rotating same; and
   said second bracket having a vertical slot therein, said slot adapted to engage said first lever arm whereby horizontal movement of said second bracket causes rotation of said first potentiometer control shaft.

9. In a system ahving a computer programmed to provide an operator with graphical display simulation of aircraft flight in which variable output voltages represent movement of aircraft ailerons, elevators, rudder and throttle, apparatus for providing the operator with simulated aircraft controls therefor comprising:
   (a) a chassis having a front panel;
   (b) means for simulating an aircraft yoke control, said means including
      (i) a first shaft projecting from said panel,
      (ii) a yoke attached to said first shaft for moving said first shaft horizontally to a simulate control of elevators and rotating said first shaft to simulate control of ailerons;
      (iii) a first potentiometer having a control element operatively coupled to said first shaft and to a source of voltage, said first potentiometer adapted to cause its said control element to rotate when said first shaft is rotated thereby producing an aileron control voltage to said computer,
      (iv) a second potentiometer having a control element operatively coupled to said first shaft and to a source of voltage, said second potentiometer adapted to cause its said control element to rotate when said first shaft is moved horizontally thereby producing an elevator control voltage to said computer,
   (c) means for simulating a throttle control, said means including
      (i) a second shaft projecting from said panel,
      (ii) a knob attached to said second shaft for moving said shaft horizontally,
      (iii) a third potentiometer having a control element operatively coupled to said second shaft and to a source of voltage, said third potentiometer adapted to cause its said control element to rotate when said second shaft is moved horizontally, thereby producing a throttle control voltage to said computer,
   (d) means for simulating a rudder control, said means including
      (i) a fourth potentiometer mounted to said panel and coupled to a source of voltage, said fourth potentiometer having a control element,
      (ii) a rudder knob coupled to said fourth potentiometer control element for rotation by an operator to thereby produce a rudder control voltage to said computer; and
   (e) a multiconductor electrical cable connected to said first, second, third and fourth potentiometers at a first end thereof and an electrical connector connected to the other end thereof for connecting to said computer, said cable for providing said voltages to said potentiometers and for communicating said aileron, elevator, throttle and rudder control voltages to said computer.

10. In a personal computer programmed to simulate flight of an aircraft, an input device for manual operation by a user to simulate aileron and elevator control of the aircraft comprising:

a chassis;

an aircraft type control yoke having a horizontally disposed yoke shaft, said yoke shaft attached to said chassis so as to be movable horizontally fore and aft with respect to said chassis and rotatable clockwise and counterclockwise;

an aileron potentiometer having a first body portion and a first rotatable wiper portion, said aileron potentiometer operatively coupled to said yoke shaft and having an input electrically connected to a voltage source and a first variable voltage output controlled by rotation of said first wiper by said yoke shaft, said aileron potentiometer moving fore and aft when said yoke shaft is moved fore and aft;

means attached to said chassis and coupled to said aileron potentiometer to prevent said first body portion thereof from rotating when said yoke shaft is rotated thereby causing rotation of said first wiper;

an elevator potentiometer having a second body portion and a second rotatable wiper, said second body portion attached to said chassis, said elevator potentiometer having an input electrically connected to said voltage source and a second variable voltage output controlled by rotation of said second wiper;

coupling means attached to said yoke shaft and to said elevator potentiometer for rotating said second wiper when said yoke shaft moves horizontally fore and aft; and electrical connection means for coupling said first and second variable voltage outputs to said computer.

* * * * *